United States Patent
Chen et al.

(10) Patent No.: US 9,166,335 B1
(45) Date of Patent: Oct. 20, 2015

(54) CONNECTOR MECHANISM WITH A GUIDE HOLE STRUCTURE, CONNECTOR MECHANISM WITH A GUIDE PIN STRUCTURE AND RELATED ELECTRONIC DEVICE ASSEMBLY

(71) Applicant: Wistron Corporation, New Taipei (TW)

(72) Inventors: Hung-Sheng Chen, New Taipei (TW); Jian-Shiang Juang, New Taipei (TW)

(73) Assignee: Wistron Corporation, Hsichih, New Taipei (TW)

( * ) Notice: Subject to any disclaimer, the term of this patent is extended or adjusted under 35 U.S.C. 154(b) by 0 days.

(21) Appl. No.: 14/510,129

(22) Filed: Oct. 9, 2014

(30) Foreign Application Priority Data

May 21, 2014 (TW) .............................. 103117793 A
May 21, 2014 (TW) .............................. 103117795 A

(51) Int. Cl.
*H01R 13/64* (2006.01)
*H01R 13/631* (2006.01)
*H01R 24/66* (2011.01)
*G06F 1/16* (2006.01)

(52) U.S. Cl.
CPC ............ *H01R 13/631* (2013.01); *G06F 1/1632* (2013.01); *H01R 24/66* (2013.01)

(58) Field of Classification Search
CPC .... H01R 13/631; H01R 13/405; H01R 24/62; H01R 13/502; H01R 13/6275; H01R 12/70

USPC .......................................................... 439/378
See application file for complete search history.

(56) References Cited

U.S. PATENT DOCUMENTS

| | | | |
|---|---|---|---|
| 6,152,773 A | 11/2000 | Chen | |
| 6,709,286 B1 * | 3/2004 | Korsunsky et al. | 439/557 |
| 6,945,824 B1 * | 9/2005 | Li et al. | 439/660 |
| 7,258,565 B2 * | 8/2007 | Huang et al. | 439/353 |
| 8,246,359 B2 | 8/2012 | Sloey | |
| 2001/0010983 A1 * | 8/2001 | Bricaud et al. | 439/630 |
| 2003/0100203 A1 * | 5/2003 | Yen | 439/79 |
| 2007/0117459 A1 * | 5/2007 | Chen | 439/607 |
| 2008/0155824 A1 * | 7/2008 | Sprouse et al. | 29/884 |
| 2008/0305690 A1 * | 12/2008 | Zhang et al. | 439/638 |

* cited by examiner

*Primary Examiner* — Jean F Duverne
(74) *Attorney, Agent, or Firm* — Winston Hsu; Scott Margo

(57) ABSTRACT

A connector mechanism is utilized to connect with a portable electronic device with a receptacle connector and a guide pin structure. The guide pin structure includes a first portion and a second portion. The connector mechanism includes a base, a plug connector and a guide hole structure. The plug connector and the guide hole structure are disposed on the base. A length of the guide hole structure is greater than a length of the plug connector. The guide hole structure includes a first area and a second area. A width of the first area is greater than a width of the second area. Width difference between the plug connector and the receptacle connector is greater than width difference between the second portion and the second area, and is greater than width difference between the first portion and the second area and between the second portion and the first area.

20 Claims, 10 Drawing Sheets

CONNECTOR MECHANISM WITH A GUIDE HOLE STRUCTURE, CONNECTOR MECHANISM WITH A GUIDE PIN STRUCTURE AND RELATED ELECTRONIC DEVICE ASSEMBLY

BACKGROUND OF THE INVENTION

1. Field of the Invention

The present disclosure relates to a connector mechanism, and more particularly, to a connector mechanism with special design for preventing the plug and the receptacle from structural interference.

2. Description of the Prior Art

A docking connector is usually applied to set between the portable electronic device and the external transmitter. A datum can be transmitted from a storage device to the portable electronic device via the external transmitter, or the portable electronic device can be charged by the commercial power via the external transmitter. The docking connector includes a male terminal and a female terminal, respectively disposed on the portable electronic device and the external transmitter. Due to difference position of the two terminals, the external transmitter may be difficult to connect with the portable electronic device because of assembly tolerance. For avoid the above-mentioned drawback, a conventional docking connector may dispose a guiding pin and a guiding hole respectively on the male terminal and the female terminal, to utilize assembly of the guiding pin and the guiding hole to connect the two terminals. However, movements of the male terminal and the female terminal are constrained when the guiding pin inserts into the guiding hole, and the conventional docking connector has drawbacks of motion deadlock and linking paralysis generated by structural interference. Design of a docking connector capable of improving assembly inaccuracy of the guiding pin and the guiding hole is an important issue in the mechanical industry.

SUMMARY OF THE INVENTION

The present disclosure provides a connector mechanism with special design for preventing the plug and the receptacle from structural interference for solving above drawbacks.

According to the claimed disclosure, a connector mechanism for connecting with a portable electronic device is disclosed. The portable electronic device has a receptacle connector and a guide pin structure adjacent to each other. The guide pin structure has a first portion and a second portion connected with each other. The first portion is a fixed end and the second portion is a free end. The connector mechanism includes a base, a plug connector and at least one guide hole structure. The plug connector is disposed on the base. The guide hole structure is disposed on the base and located by the plug connector. A length of the guide hole structure is greater than a length of the plug connector. The guide hole structure includes a first area and a second area. The first area has a width B1, and an end of the first area is connected to the base. The second area has a width B2 and is connected to the other end of the first area, and B1>B2. A width difference D1 is existed between the second portion and the second area, a width difference D1' is existed between the first portion and the second area, a width difference D2 is existed between the plug connector and the receptacle connector, a width difference D3 is existed between the second portion and the first area, and D1<D2, D2<D3, D2<D1'.

According to the claimed disclosure, the length of the second area is substantially equal to a length difference between the guide hole structure and the plug connector.

According to the claimed disclosure, the guide hole structure further includes a buffer area located between the first area and the second area. A width difference D4 is existed between the second portion and the buffer area, and D4<D2.

According to the claimed disclosure, an interface between the first area and the second area is a ladder structure or an inclined structure.

According to the claimed disclosure, the first area has a length L1, the second area has a length L2, and a value of L1/L2 is set between 1~10.

According to the claimed disclosure, the guide hole structure includes a plurality of units Mi, i=1~n, and a width of the unit Mi+1 is not greater than a width of the unit Mi.

According to the claimed disclosure, a connector mechanism for connecting with an external electronic device is disclosed. The external electronic device has a plug connector and a guide hole structure adjacent to each other. The guide hole structure has a first area and a second area connected with each other, and respectively located on a bottom and an opening of the guide hole structure. The connector mechanism includes a pedestal, a receptacle connector and at least one guide pin structure. The receptacle connector is disposed on the pedestal. The guide pin structure is disposed on the pedestal and located by the receptacle connector. A length of the guide pin structure is substantially equal to a length of the receptacle connector. The guide pin structure includes a first portion and a second portion. The first portion has a width W1, and an end of the first portion is connected to the pedestal. The second portion has a width W2 and is connected to the other end of the first portion, and W1<W2. A width difference D1 is existed between the second portion and the second area, a width difference D1' is existed between the first portion and the second area, a width difference D2 is existed between the plug connector and the receptacle connector, a width difference D3 is existed between the second portion and the first area, and D1<D2, D2<D3, D2<D1'.

According to the claimed disclosure, the guide hole structure further includes a buffer area located between the first area and the second area. A width difference D4 is existed between the second portion and the buffer area, and D4<D2.

According to the claimed disclosure, a free end of the guide pin structure is an arc structure or a tip structure.

According to the claimed disclosure, an interface between the first portion and the second portion is a ladder structure or an inclined structure.

According to the claimed disclosure, the connector mechanism further includes a strengthening rib disposed between the pedestal and the first portion.

According to the claimed disclosure, the guide pin structure includes a plurality of units Ni, i=1~n, and a width of the unit Ni+1 is not smaller than a width of the unit Ni.

According to the claimed disclosure, an electronic device assembly includes a portable electronic device, an external electronic device and a connector mechanism. The external electronic device is detachably assembled with the portable electronic device. The external electronic device is electrically connected with the portable electronic device via the connector mechanism. The connector mechanism includes a base, a plug connector, at least one guide hole structure, a pedestal, a receptacle connector and at least one guide pin structure. The base is located inside the external electronic device. The plug connector is disposed on the base. The guide hole structure is disposed on the base and located by the plug connector. The guide hole structure includes a first area and a second area. The first area has a width B1, and an end of the first area is connected to the base. The second area has a width B2 and is connected to the other end of the first area, and B1>B2. The pedestal is located inside the portable electronic device. The receptacle connector is disposed on the pedestal. The guide pin structure is disposed on the pedestal and located by the receptacle connector. The guide pin structure includes a first portion and a second portion. The first portion has a width W1, and an end of the first portion is connected to the pedestal. The second portion has a width W2 and is connected to the other end of the first portion, and W1<W2. A width difference D1 is existed between the second portion and the second area, a width difference D1' is existed between the first portion and the second area, a width difference D2 is existed between the plug connector and the receptacle connector, a width difference D3 is existed between the second portion and the first area, and D1<D2, D2<D3, D2<D1'. A total length of the guide pin structure and the guide hold structure is greater than a total length of the plug connector and the receptacle connector.

The present disclosure utilizes specific design of the guide pin structure and the guide hole structure to avoid the structural interference between the plug connector and the receptacle connector, so as to avert unnecessary rework, economize inspection cost and increase product yield.

These and other objectives of the present disclosure will no doubt become obvious to those of ordinary skill in the art after reading the following detailed description of the preferred embodiment that is illustrated in the various figures and drawings.

DETAILED DESCRIPTION

Figure 1:
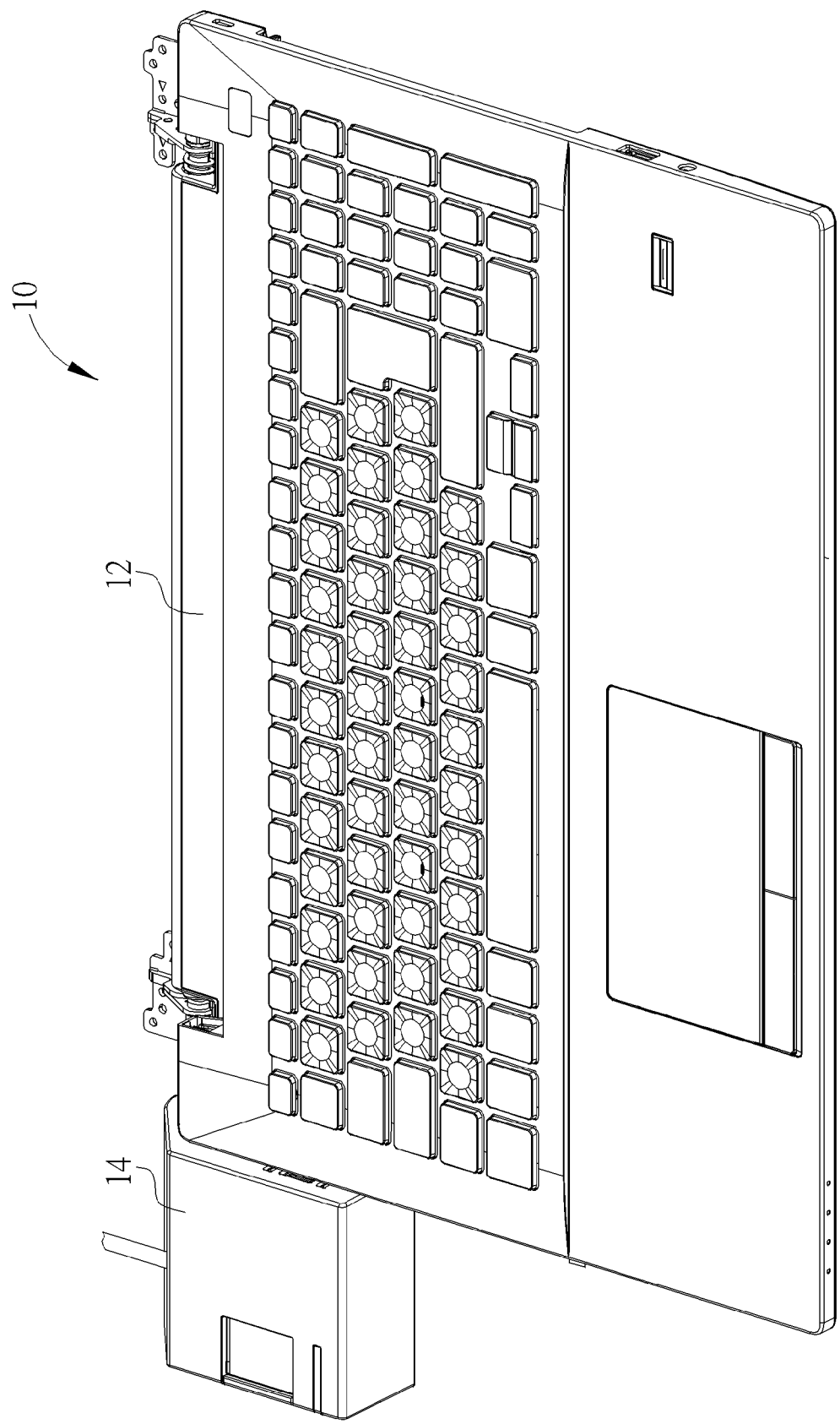
FIG. 1 and FIG. 2 are diagrams of an electronic device assembly in different modes according to an embodiment of the present disclosure.
Figure 2:
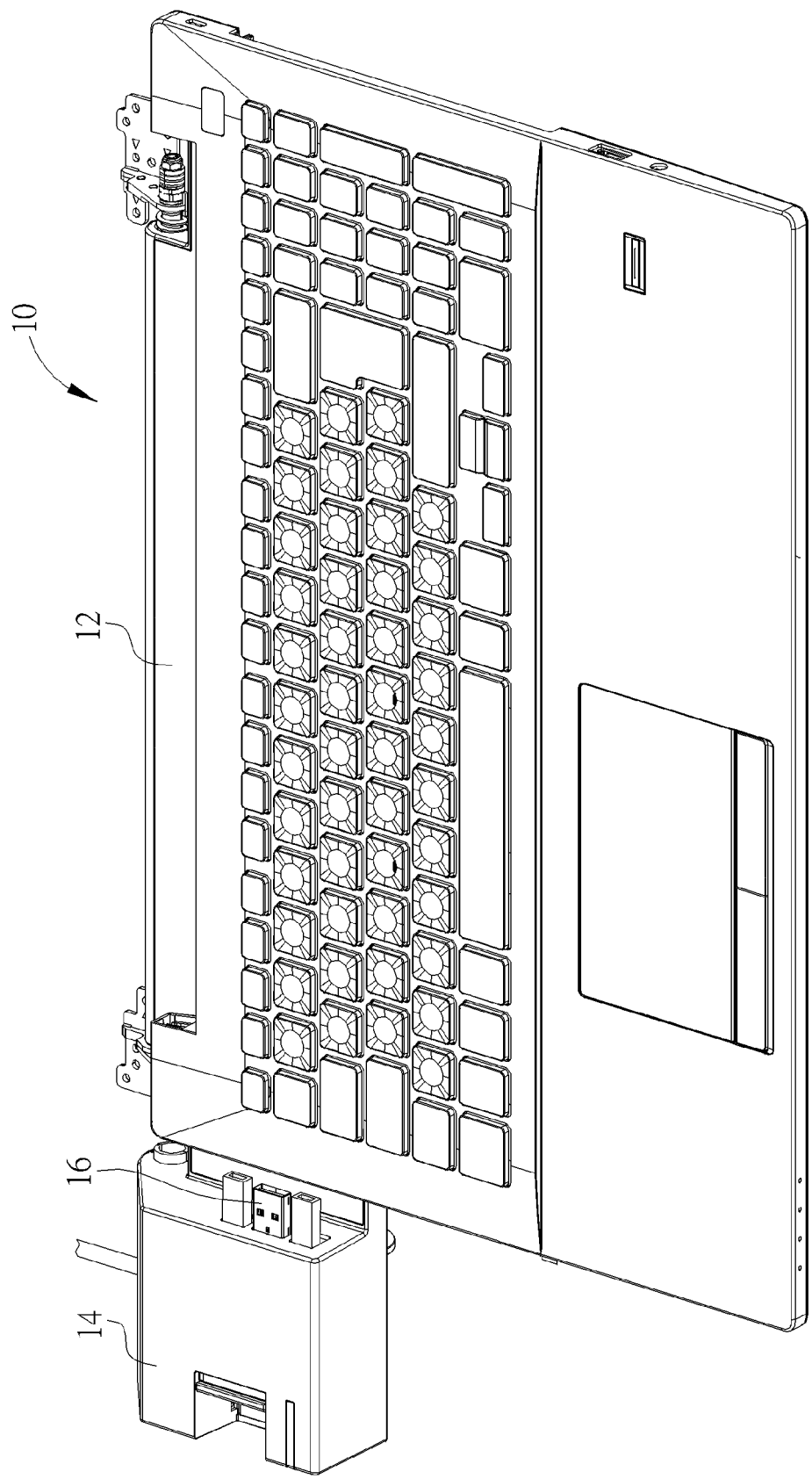
Figure 3:
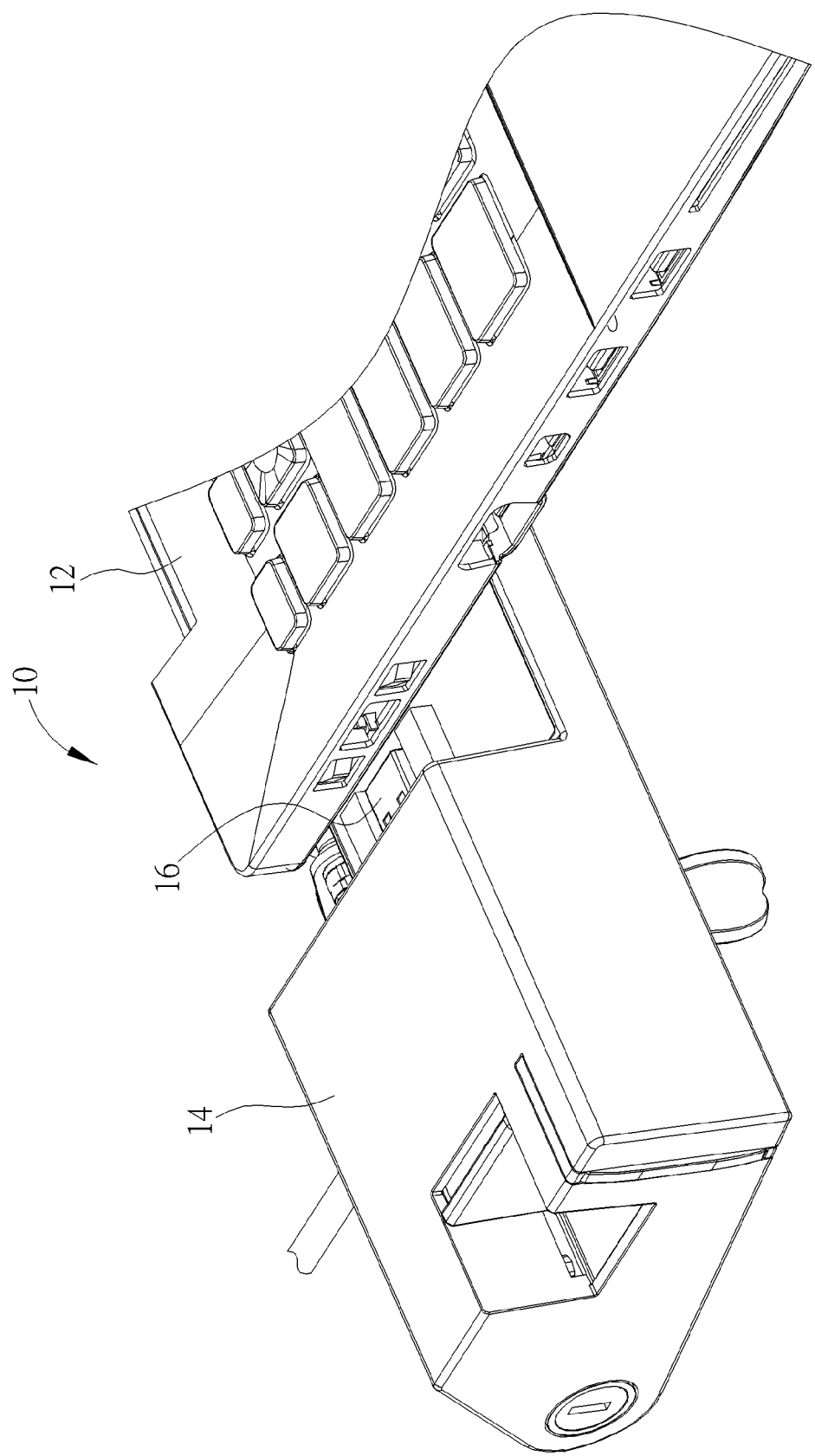
FIG. 3 is another view of the electronic device assembly shown in FIG. 2.

Please refer to FIG. 1 to FIG. 3. FIG. 1 and FIG. 2 are diagrams of an electronic device assembly 10 in different modes according to an embodiment of the present disclosure. FIG. 3 is another view of the electronic device assembly 10 shown in FIG. 2. The electronic device assembly 10 includes a portable electronic device 12, an external electronic device 14 and a connector mechanism 16. Generally, the portable electronic device 12 can be a notebook computer, a tablet computer, a smart phone, a personal digital assistance and so on. The external electronic device 14 can be a battery charger, a flash disk and/or a signal adapter. The external electronic device 14 can be detachably assembled with the portable electronic device 12 via the connector mechanism 16 for signal transmission or electric charge. The connector mechanism 16 in the present disclosure provides the specific guide pin/hole structures to effectively increase orientation accuracy and operational fluency of connection between the portable electronic device 12 and the external electronic device 14.

Figure 4:
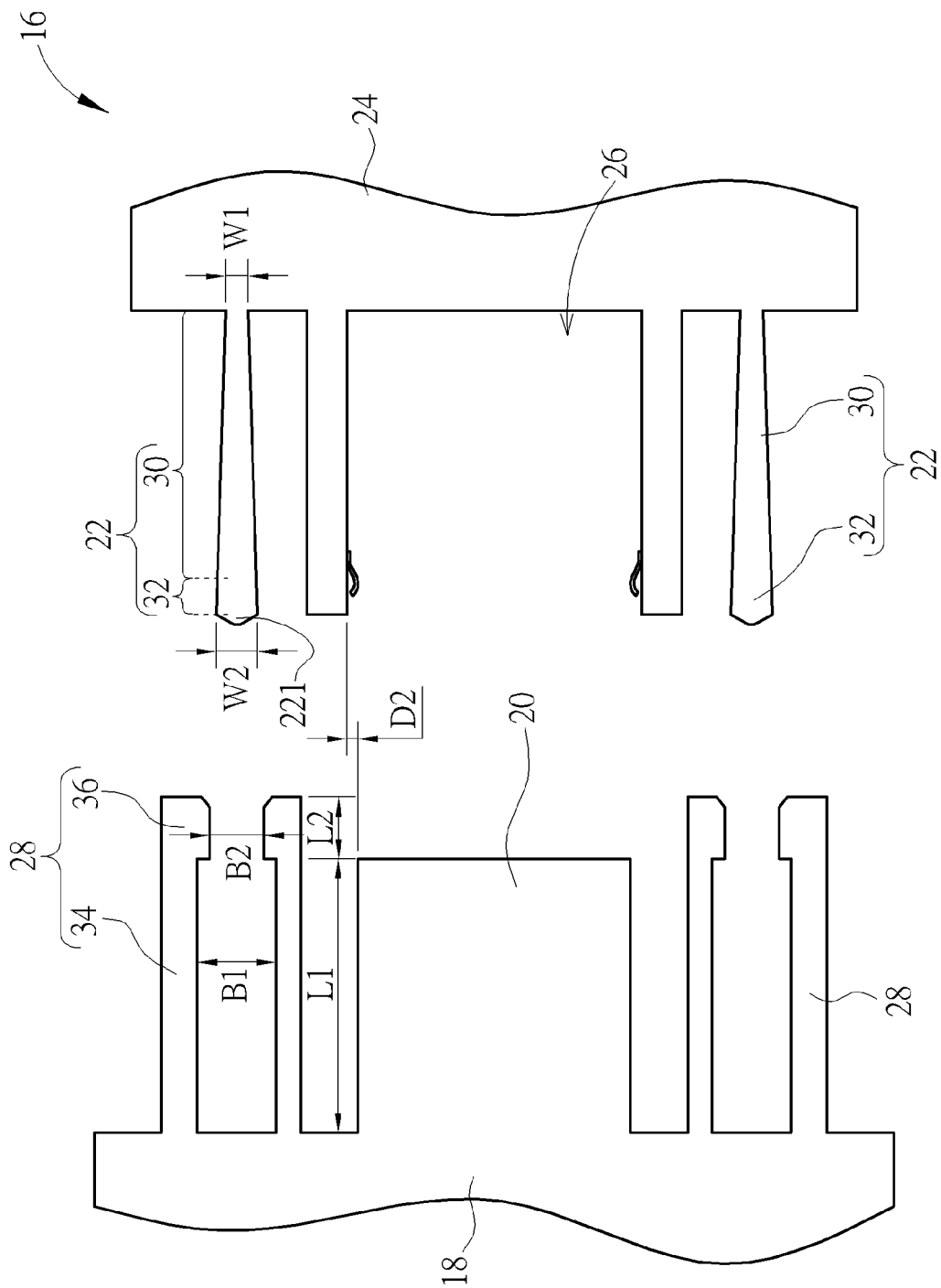
FIG. 4 to FIG. 6 respectively are diagrams of a connector mechanism in different modes according to the embodiment of the present disclosure.
Figure 5:
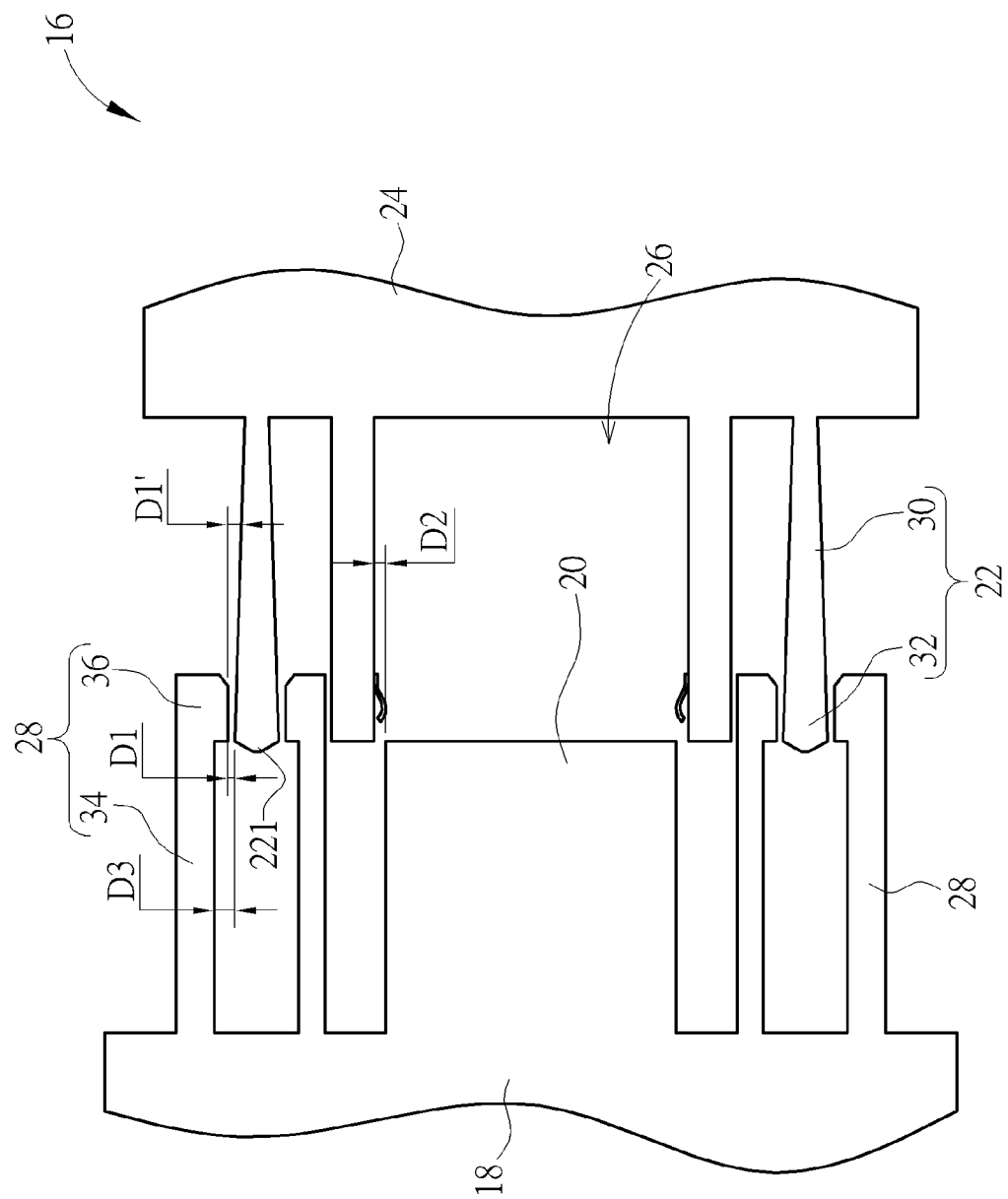
Figure 6:
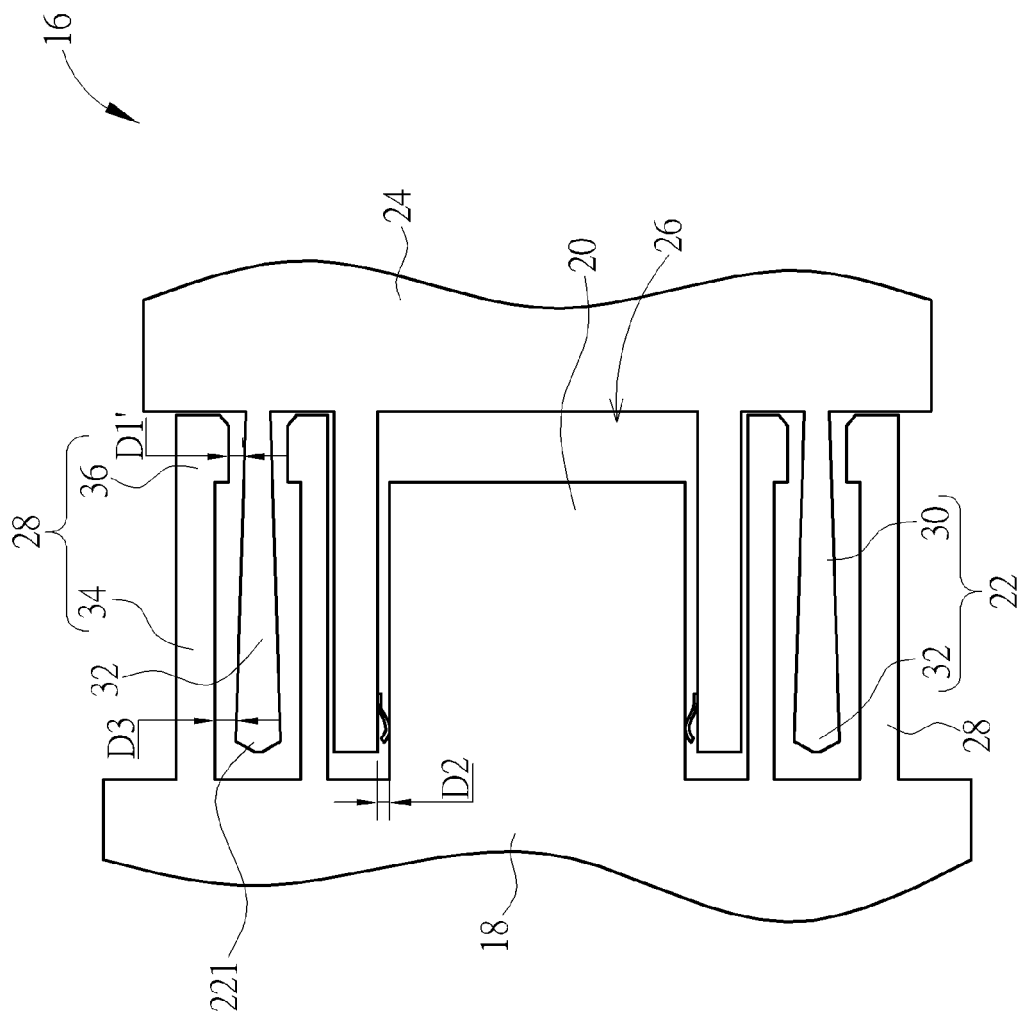

Please refer to FIG. 4 to FIG. 6. FIG. 4 to FIG. 6 respectively are diagrams of the connector mechanism 16 in different modes according to the embodiment of the present disclosure. The connector 16 includes a base 18, a plug connector 20, a guide pin structure 22, a pedestal 24, a receptacle connector 26 and a guide hole structure 28. The base 18 and the pedestal 24 are respectively located inside the external portable electronic device 14 and the portable electronic device 12. The plug connector 20 is disposed on the base 18, and the receptacle connector 26 is disposed on the pedestal 24. An amount of the guide hole structure 28 is at least one or more. For example, the connector mechanism 16 may have two guide hole structures 28 for correct connection between the plug connector 20 and the receptacle connector 26. The guide hole structures 28 are disposed on the base 18 and respectively located by sides of the plug connector 20. An amount of the guide pin structure 22 corresponds to an amount of the guide hole structure 28, and each of the guide pin structures 22 is disposed on the pedestal 24 and located by the side of the receptacle connector 26.

The guide pin structure 22 includes a first portion 30 and a second portion 32. Two ends of the first portion 30 are respectively connected to the pedestal 24 and the second portion 32. An end (which is not connected to the first portion 30) of the second portion 32 opposite to the first portion 30 can be a free end 221 of the guide pin structure 22. The free end 211 inserts into the corresponding guide hole structure 28 for orientation before the plug connector 20 gets in contact with the receptacle connector 26. It should be mentioned that the first portion 30 has a width W1, the second portion 32 has a width W2, and the width W2 is greater than the width W1.

The guide hole structure 28 includes a first area 34 and a second area 36. An end of the first area 34 is connected to the base 18, and the second area 36 is connected to the other end of the first area 34, which means the first area 34 is located on a bottom of the guide hole structure 28 and the second area 36 is located on an opening of the guide hole structure 28. Dimensions of the guide hole structure 28 is designed according to dimensions of the guide pin structure 22. For example, the first area 34 has a width B1, the second area 36 has a width B2, and the width B1 is greater than the width B2. Further, the first portion 30 has a length L1, the second portion 32 has a length L2, the length L1 is greater than the length L2, and a value of L1/L2 is preferably set between 1~10. In the present disclosure, the guide pin structure 22 includes two portions that respectively have a wide front (the free end) and a narrow rear (the fixed end), and the guide hole structure 28 includes two areas that respectively have a narrow front (the opening) and a wide rear (the bottom). When the guide hole structure 28 just gets in contact with the guide pin structure 22, assembly tolerance between the guide pin structure 22 and the guide hole structure 28 is smaller than assembly tolerance between the plug connector 20 and the receptacle connector 26, and orientation function of the connector mechanism 16 is led by the pin structure 22 and the guide hole structure 28. As the guide pin structure 22 is partially sheathed by the guide hole structure 28, the assembly tolerance between the guide pin structure 22 and the guide hole structure 28 is greater than the assembly tolerance between the plug connector 20 and the receptacle connector 26, and the orientation function of the connector mechanism 16 is change to be led by the plug connector 20 and the receptacle connector 26.

A total length of the guide pin structure 22 and the guide hole structure 28 is greater than a total length of the plug connector 20 and the receptacle connector 26 in order to utilize the guide pin structure 22 and the guide hole structure 28 for orientation navigation before the plug connector 20 is assembled with the receptacle connector 26. In the embodiment of the present disclosure, a length of the guide hole structure 28 is greater than a length of the plug connector 20, and a length of the guide pin structure 22 is substantially equal to a length of the receptacle connector 26, as shown in FIG. 4 to FIG. 6. Therefore, a protruding unit (such as the guide hole structure 28) is disposed on a connective port of the external electronic device 14, and the portable electronic device 12 has no protruding unit disposed on its connective port (because the guide pin structure 22 aligns with the receptacle connector 26), so as to conform to industry design demand and provide preferred product aesthetic.

Structural characteristics of the guide pin structure 22 and the guide hole structure 28 are introduced as following description. A width difference D1 is existed between the second portion 32 and the second area 36, a width difference D1' is existed between the first portion 30 and the second area 36, a width difference D2 is existed between the plug connector 20 and the receptacle connector 26, and a width difference D3 is existed between the second portion 32 and the first area 34. The width difference D1 is smaller than the width difference D2, the width difference D2 is smaller than the width difference D3, and the width difference D2 is further smaller than the width difference D1'. As shown in FIG. 4, the guide hoe structure 28 does not get in contact with the guide pin structure 22. In the embodiment of the present disclosure, the length of the second area 36 is substantially equal to a length difference between the guide hole structure 28 and the plug connector 20, so that the second area 36 can get in contact with the guide pin structure 22 for leading the orientation of the connector mechanism 16 before the plug connector 20 is assembled with the receptacle connector 26.

As shown in FIG. 5, the second portion 32 is sheathed by the second area 36 of the guide hole structure 28. Because the width difference D1 is smaller than the width difference D2, the orientation of the connector mechanism 16 is led by the guide pin structure 22 and the guide hole structure 28, to ensure that the plug connector 20 can accurately align with the opening of the receptacle connector 26. As shown in FIG. 6, the guide hole structure 28 covers the guide pin structure 22 wider to locate the second portion 32 inside the first area 34, and the first portion 30 is located inside the second area 36. Because the width difference D2 is smaller than the width difference D3 and the width difference D1', the orientation of the connector mechanism 16 is led by the plug connector 20 and the receptacle connector 26 and has no effect by the guide pin structure 22 and the guide hole structure 28, so as to prevent the connector mechanism 16 from damage by assembly failure between the guide pin structure 22 and the guide hole structure 28. The plug connector 20 can instantly lead the orientation of the connector mechanism 16 since the second portion 32 moves from the second area 36 to the first area 34.

Figure 7:
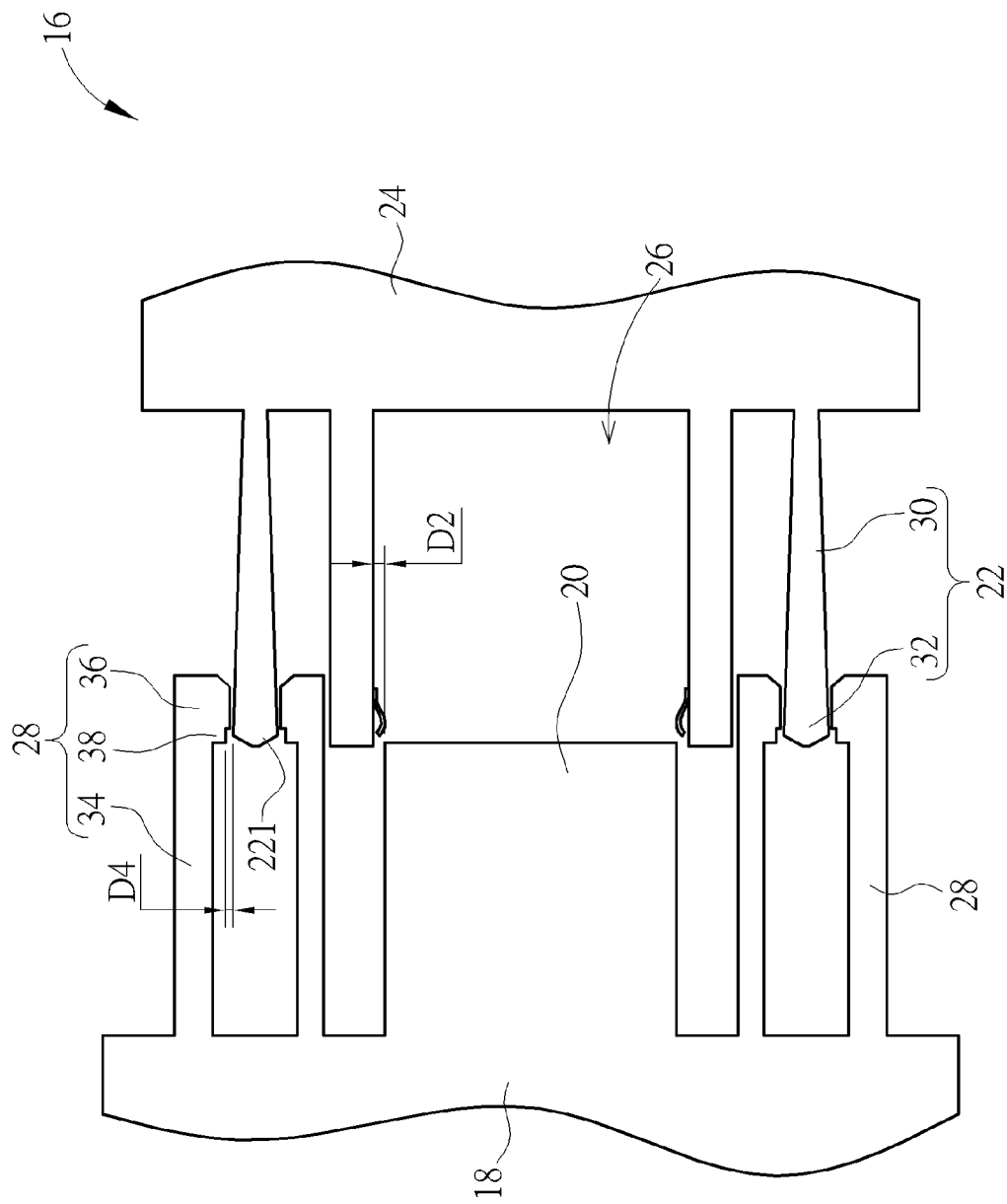
FIG. 7 is a partial diagram of the connector mechanism according to another embodiment of the present disclosure.

The guide hole structure 28 further selectively includes a buffer area 38 disposed between the first area 34 and the second area 36. Please refer to FIG. 7. FIG. 7 is a partial diagram of the connector mechanism 16 according to another embodiment of the present disclosure. A width difference D4 is existed between the second portion 32 and the buffer area 38, and the width difference D4 is smaller than the width difference D2. The second portion 32 may pass through the buffer area 38 when moving from the second area 36 to the first area 34. A length of the buffer area 38 may be equal to 1~2 mm. Since the second portion 32 moves into the buffer area 38, a part of the plug connector 20 inserts into the receptacle connector 26 already; in a meanwhile, the orientation of the connector mechanism 16 is still led by the guide pin structure 22 and the guide hole structure 28, and resilient deformation may be generated to prevent the plug connector 20 and the receptacle connector 26 from structural interference. The buffer area 38 is adapted to switch the orientation leading of the connector mechanism 16 from the guide pin structure 22 and the guide hole structure 28 smoothly to the plug connector 20 and the receptacle connector 26.

Figure 8:
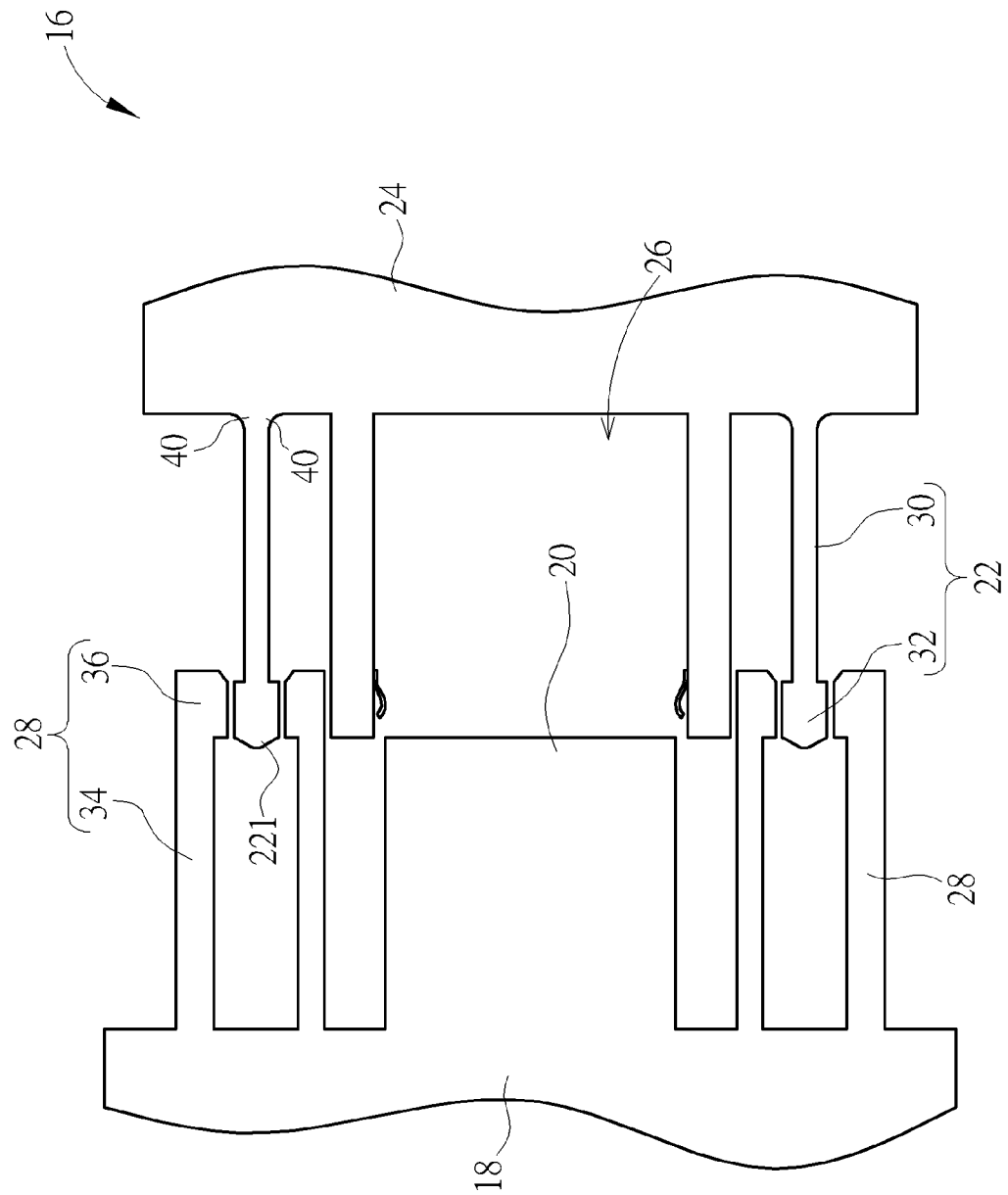
FIG. 8 is a partial diagram of the connector mechanism according to another embodiment of the present disclosure.

In the above-mentioned embodiment, the free end 221 of the guide pin structure 22 is a tip structure (which means its angle is smaller than 180 degrees), an interface between the first area 34 and the second area 36 is a ladder structure, and an interface between the first portion 30 and the second portion 32 is an inclined structure. Shapes of the guide pin structure 22 and the guide hole structure 28 further can have different types. Please refer to FIG. 8. FIG. 8 is a partial diagram of the connector mechanism 16 according to another embodiment of the present disclosure. As shown in FIG. 8, the free end 221 can be an arc structure, and the shape of the free end 221 is not limited to the above-mentioned tip or arc structures. Any shape capable of guiding the guide pin structure 22 smoothly into the guide hole structure 28 belongs to scope of the free end 221 of the present disclosure. The interface between the first area 34 and the second area 36 and/or between the first portion 30 and the second portion 32 further can be the inclined structure or the ladder structure. Any structural characteristic conforming to the portions with the wide front and the narrow rear and the areas with the narrow front and the wide rear belongs to scope of the guide pin structure 22 and the guide hole structure 28 of the present disclosure, and a detailed description is omitted herein for simplicity.

The connector mechanism 16 further includes a plurality of strengthening ribs 40 disposed between the pedestal 24 and the first portion 30, selectively. The strengthening rib 40 is utilized to strengthen connective strength between the first portion 30 and the pedestal 24. In the preferred embodiment, dimension of a connective border between the first portion 30 and the pedestal 24 may be greater than 2 mm, and the strengthening rib 40 is applied to increase the connective strength between the first portion 30 and the pedestal 24.

Figure 9:
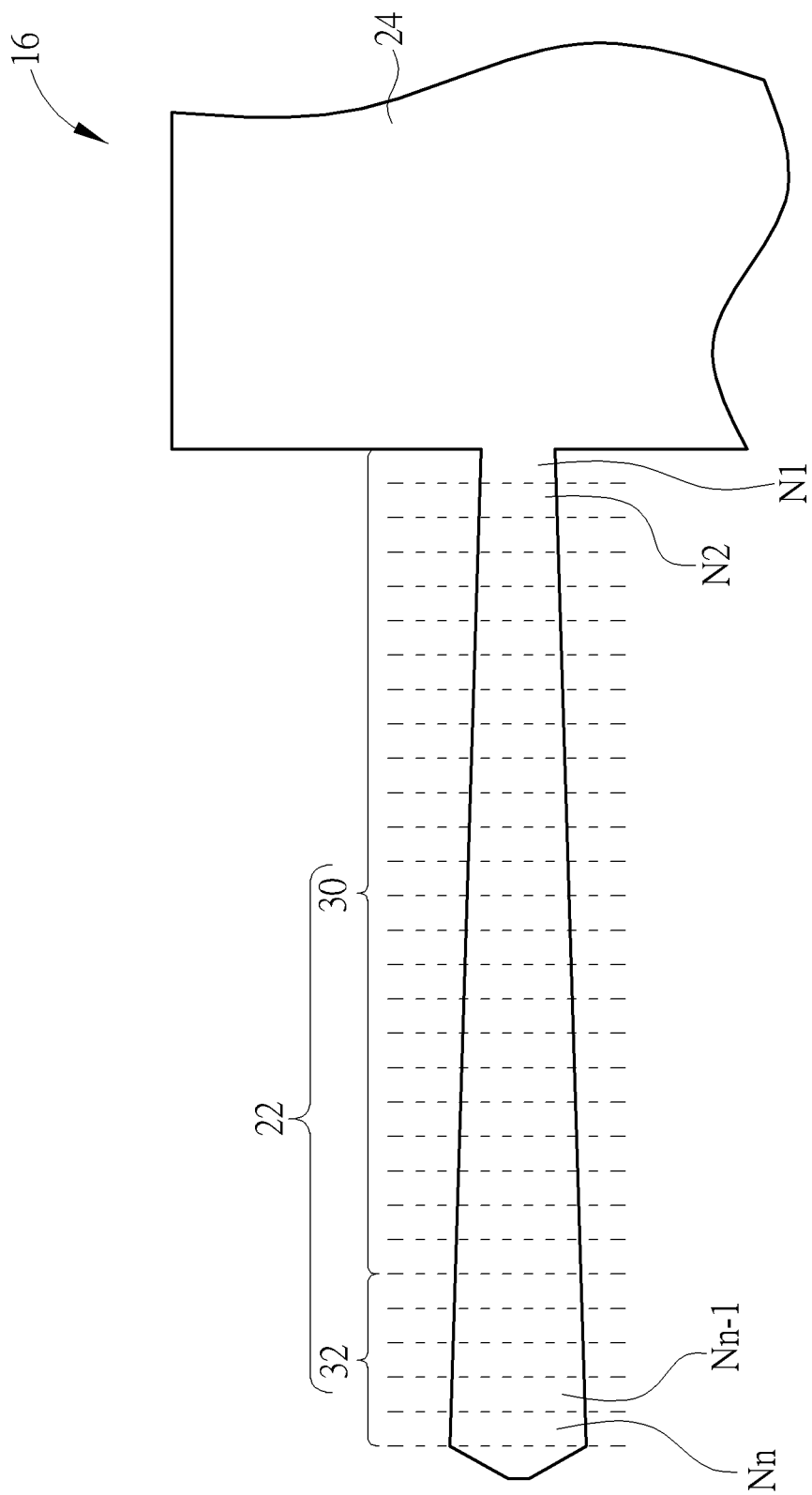
FIG. 9 is a partial diagram of the connector mechanism shown in FIG. 8.

Please refer to FIG. 9. FIG. 9 is a partial diagram of the connector mechanism 16 shown in FIG. 8. The guide pin structure 22 can be divided into a plurality of units $N_i$, and $i=1\sim n$. The unit $N_1$ is connected to the pedestal 24, and the unit $N_n$ is the free end of the guide pin structure 22. Generally, a width of the unit $N_{i+1}$ is not smaller than (which means can be greater than or equal to) a width of the unit $N_i$, to ensure that the orientation of the connector mechanism 16 is led by the guide pin structure 22 and the guide hole structure 28 since the plug connector 20 does not insert into the receptacle connector 26, and the foresaid orientation is switched to be led by the plug connector 20 and the receptacle connector 26 after the plug connector 20 inserts into the receptacle connector 26. In another possible embodiment, the width of the unit $N_i$ of the first portion 30 can be smaller than ones of the unit $N_{i-1}$ as long as the width of the unit $N_{i+1}$ of the second portion 32 is not smaller than ones of the unit $N_i$.

Figure 10:
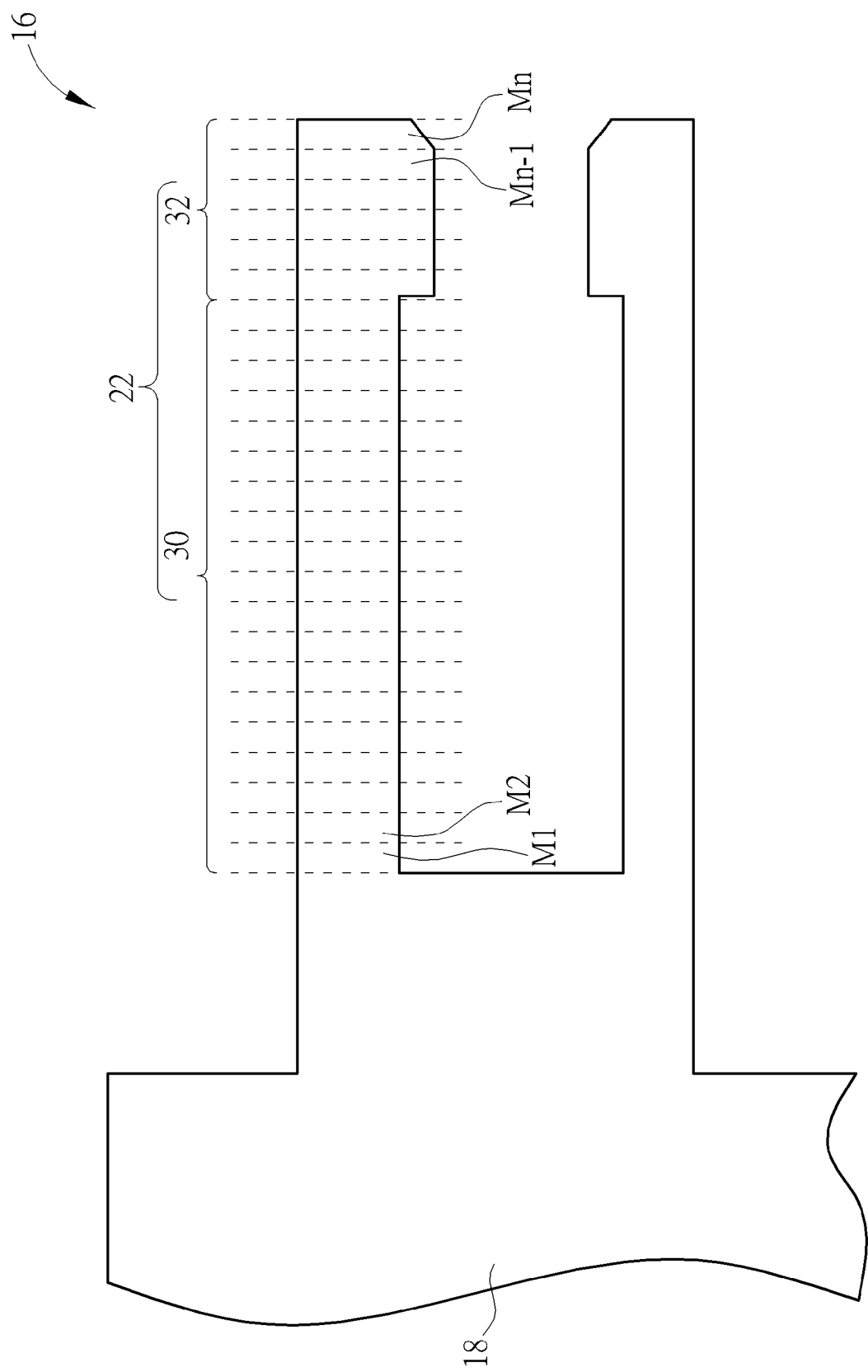
FIG. 10 is a partial diagram of the connector mechanism shown in FIG. 8.

Please refer to FIG. 10. FIG. 10 is a partial diagram of the connector mechanism 16 shown in FIG. 8. The guide hole structure 28 can be divided into a plurality of units $M_i$, and $i=1\sim n$. The unit $M_1$ is connected to the base 18, and the unit $M_n$ is the free end of the guide hole structure 28. Generally, the width of the unit $M_{i+1}$ is not greater than (which means can be smaller than or equal to) the width of the unit Mi, as design of the above-mentioned guide pin structure 22. In another possible embodiment, the width of the unit Mi of the first area 34 can be greater than ones of the unit Mi−1 as long as the width of the unit Mi+1 of the second area 36 is not greater than ones of the unit Mi.

In conclusion, the present disclosure disposes the guide hole structures on sides of the plug connector of the external electronic device, the length of the guide hole structure is greater than the length of the plug connector, and the guide hole structure can sheathe on the corresponding guide pin structure for the orientation leading before the plug connector is assembled with the receptacle connector. The free end (the second portion) is wider than the fixed end (the first portion) of the guide pin structure. The opening (the second area) is narrow than the bottom (the first area) of the guide hole structure. In a first phase of sheathing between the guide pin structure and the guide hole structure, the second portion is located within the second area, and the orientation of the connector mechanism is led by the guide pin structure and the guide hole structure due to the width difference D1 smaller than the width difference D2. In a second phase of the sheathing between the guide pin structure and the guide hole structure, the second portion is located within the buffer area, the plug connector is slightly inserted into the receptacle connector, and the orientation of the connector mechanism is still led by the guide pin structure and the guide hole structure due to the width difference D4 smaller than the width difference D2. In a third phase of the sheathing between the guide pin structure and the guide hole structure, the second portion is located within the first area, the first portion is located within the second area, the width difference D2 is smaller than the width difference D3 and the width difference D1', and the orientation of the connector mechanism is led by the plug connector and the receptacle connector.

The present disclosure changes the structural characteristics of the guide pin structure and the guide hole structure, the orientation leading of the connector mechanism can be switched to an assembly of the guide pin structure and the guide hole structure, or to an assembly of the plug connector and the receptacle connector in different phases via variation of the width difference between different parts of the guide pin structure and the guide hole structure. The buffer area is small and can be selectively designed on the guide hole structure to effectively prevent the plug connector and the receptacle connector from unexpected structural interference when the connector mechanism is switched from the first phase to the second phase and further to the third phase. Comparing to the prior art, the present disclosure utilizes specific design of the guide pin structure and the guide hole structure to avoid the structural interference between the plug connector and the receptacle connector, so as to avert unnecessary rework, economize inspection cost and increase product yield.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:

1. A connector mechanism with a guide hole structure for connecting with a portable electronic device, the portable electronic device having a receptacle connector and a guide pin structure adjacent to each other, the guide pin structure having a first portion and a second portion connected with each other, the first portion being a fixed end and the second portion being a free end, the connector mechanism comprising:
   a base;
   a plug connector disposed on the base; and
   at least one guide hole structure disposed on the base and located by the plug connector, a length of the guide hole structure being greater than a length of the plug connector, the guide hole structure comprising:
      a first area having a width B1, an end of the first area being connected to the base; and
      a second area having a width B2 and connected to the other end of the first area, and B1>B2, a width difference D1 being existed between the second portion and the second area, a width difference D1' being existed between the first portion and the second area, a width difference D2 being existed between the plug connector and the receptacle connector, a width difference D3 being existed between the second portion and the first area, and D1<D2, D2<D3, D2<D1'.

2. The connector mechanism of claim 1, wherein the length of the second area is substantially equal to a length difference between the guide hole structure and the plug connector.

3. The connector mechanism of claim 1, wherein the guide hole structure further comprises a buffer area located between the first area and the second area, a width difference D4 is existed between the second portion and the buffer area, and D4<D2.

4. The connector mechanism of claim 1, wherein an interface between the first area and the second area is a ladder structure or an inclined structure.

5. The connector mechanism of claim 1, wherein the first area has a length L1, the second area has a length L2, and a value of L1/L2 is set between 1~10.

6. The connector mechanism of claim 1, wherein the guide hole structure comprises a plurality of units Mi, i=i~n, and a width of the unit Mi+1 is not greater than a width of the unit Mi.

7. A connector mechanism with a guide pin structure for connecting with an external electronic device, the external electronic device having a plug connector and a guide hole structure adjacent to each other, the guide hole structure having a first area and a second area connected with each other and respectively located on a bottom and an opening of the guide hole structure, the connector mechanism comprising:
   a pedestal;
   a receptacle connector disposed on the pedestal; and
   at least one guide pin structure disposed on the pedestal and located by the receptacle connector, a length of the guide pin structure being substantially equal to a length of the receptacle connector, the guide pin structure comprising:
      a first portion having a width W1, an end of the first portion being connected to the pedestal; and
      a second portion having a width W2 and connected to the other end of the first portion, and W1<W2, a width difference D1 being existed between the second portion and the second area, a width difference D1' being existed between the first portion and the second area, a width difference D2 being existed between the plug connector and the receptacle connector, a width difference D3 being existed between the second portion and the first area, and D1<D2, D2<D3, D2<D1'.

8. The connector mechanism of claim 7, wherein the guide hole structure further comprises a buffer area located between the first area and the second area, a width difference D4 is existed between the second portion and the buffer area, and D4<D2.

9. The connector mechanism of claim 7, wherein a free end of the guide pin structure is an arc structure or a tip structure.

10. The connector mechanism of claim 7, wherein an interface between the first portion and the second portion is a ladder structure or an inclined structure.

11. The connector mechanism of claim 7, further comprising:
a strengthening rib disposed between the pedestal and the first portion.

12. The connector mechanism of claim 7, wherein the guide pin structure comprises a plurality of units Ni, i=1~n, and a width of the unit Ni+1 is not smaller than a width of the unit Ni.

13. An electronic device assembly comprising:
a portable electronic device;
an external electronic device detachably assembled with the portable electronic device; and
a connector mechanism, the external electronic device being electrically connected with the portable electronic device via the connector mechanism, the connector mechanism comprises:
 a base located inside the external electronic device;
 a plug connector disposed on the base;
 at least one guide hole structure disposed on the base and located by the plug connector, the guide hole structure comprising:
  a first area having a width B1, an end of the first area being connected to the base; and
  a second area having a width B2 and connected to the other end of the first area, and B1>B2;
 a pedestal located inside the portable electronic device;
 a receptacle connector disposed on the pedestal; and
 at least one guide pin structure disposed on the pedestal and located by the receptacle connector, the guide pin structure comprising:
  a first portion having a width W1, an end of the first portion being connected to the pedestal; and
  a second portion having a width W2 and connected to the other end of the first portion, and W1<W2, a width difference D1 being existed between the second portion and the second area, a width difference D1' being existed between the first portion and the second area, a width difference D2 being existed between the plug connector and the receptacle connector, a width difference D3 being existed between the second portion and the first area, and D1<D2, D2<D3, D2<D1';
 wherein a total length of the guide pin structure and the guide hold structure is greater than a total length of the plug connector and the receptacle connector.

14. The electronic device assembly of claim 13, wherein a length of the guide hole structure is greater than a length of the plug connector, and a length of the guide pin structure is substantially equal to a length of the receptacle connector.

15. The electronic device assembly of claim 13, wherein a length of the second area is substantially equal to a length difference between the guide hole structure and the plug connector.

16. The electronic device assembly of claim 13, wherein the guide hole structure further comprises a buffer area located between the first area and the second area, a width difference D4 is existed between the second portion and the buffer area, and D4<D2.

17. The electronic device assembly of claim 13, wherein an interface between the first area and the second area and an interface between the first portion and the second portion respectively are a ladder structure or an inclined structure.

18. The electronic device assembly of claim 13, wherein the first area has a length L1, the second area has a length L2, and a value of L1/L2 is set between 1~10.

19. The electronic device assembly of claim 13, wherein a free end of the guide pin structure is an arc structure or a tip structure.

20. The electronic device assembly of claim 13, wherein the connector mechanism further comprises a strengthening rib disposed between the base and the first portion.

\* \* \* \* \*